United States Patent [19]
Tiller et al.

[11] Patent Number: 6,040,555
[45] Date of Patent: Mar. 21, 2000

[54] REMOTE CONTROL FOR WELDERS AND METHOD THEREFOR

[75] Inventors: Randolph C. Tiller, Glenview, Ill.; Robert G. Williams, Appleton, Wis.

[73] Assignee: Illinois Tool Works Inc., Glenview, Ill.

[21] Appl. No.: 09/027,330

[22] Filed: Feb. 20, 1998

[51] Int. Cl.[7] .................................................. B23K 9/10
[52] U.S. Cl. ........................................ 219/132; 219/133
[58] Field of Search ................................ 219/132, 130.5, 219/133, 134

[56] References Cited

U.S. PATENT DOCUMENTS

| | | |
|---|---|---|
| 2,043,331 | 6/1936 | Notvest ..................................... 219/132 |
| 2,175,891 | 10/1939 | Graham . |
| 2,526,597 | 10/1950 | Winslow ................................. 219/132 |
| 2,642,515 | 6/1953 | Bagg ......................................... 219/132 |
| 4,216,367 | 8/1980 | Risberg . |
| 4,216,368 | 8/1980 | Delay . |
| 4,227,066 | 10/1980 | Bulwidas, Jr. . |
| 4,266,114 | 5/1981 | Hanson . |
| 4,410,789 | 10/1983 | Story . |
| 4,641,292 | 2/1987 | Tunnell et al. . |
| 5,039,835 | 8/1991 | Schwiete . |
| 5,276,305 | 1/1994 | Hsien . |
| 5,406,050 | 4/1995 | Macomber et al. . |

FOREIGN PATENT DOCUMENTS

| | | |
|---|---|---|
| 2507822 | 9/1976 | Germany . |
| 1-27824 | 5/1989 | Japan . |
| 1-27828 | 5/1989 | Japan . |
| 4-162964 | 6/1992 | Japan ..................................... 219/132 |
| 7409616 | 1/1975 | Netherlands . |

OTHER PUBLICATIONS

Miller Electric Mfg. Co., "Bobcat™ 225G Plus" Brochure, Sep. 1994, pp. 1–6.

Messer Cutting & Welding, "Stick 300 CEL/PWS" brochure, known to Applicant Sep. 1997, 1 pg.

*Primary Examiner*—Clifford C. Shaw
*Attorney, Agent, or Firm*—Mark W. Croll; Thomas W. Buckman; John P. O'Brien

[57] ABSTRACT

A method and system for remotely controlling operational parameters of welders by communicating over a welding cable thereof with a remote device electrically coupleable between a workpiece and an electrode holder of the welder. The operational parameters include remotely enabling and disabling the welder, remotely choking the engine thereof, remotely controlling coarse and fine current adjustment, and remotely controlling other parameters otherwise controllable from a control panel of the welder. The remote device having one or more operational parameter signal circuits electrically coupleable between the workpiece and the electrode holder for producing unique operational signals on the welding cable, a sensor circuit that detects the operational signals and produces corresponding operational sense signal in response thereto, and an operational control circuit that actuates operation controls corresponding to the operational parameters on the control panel of the welder in response to the operational sense signals.

42 Claims, 11 Drawing Sheets

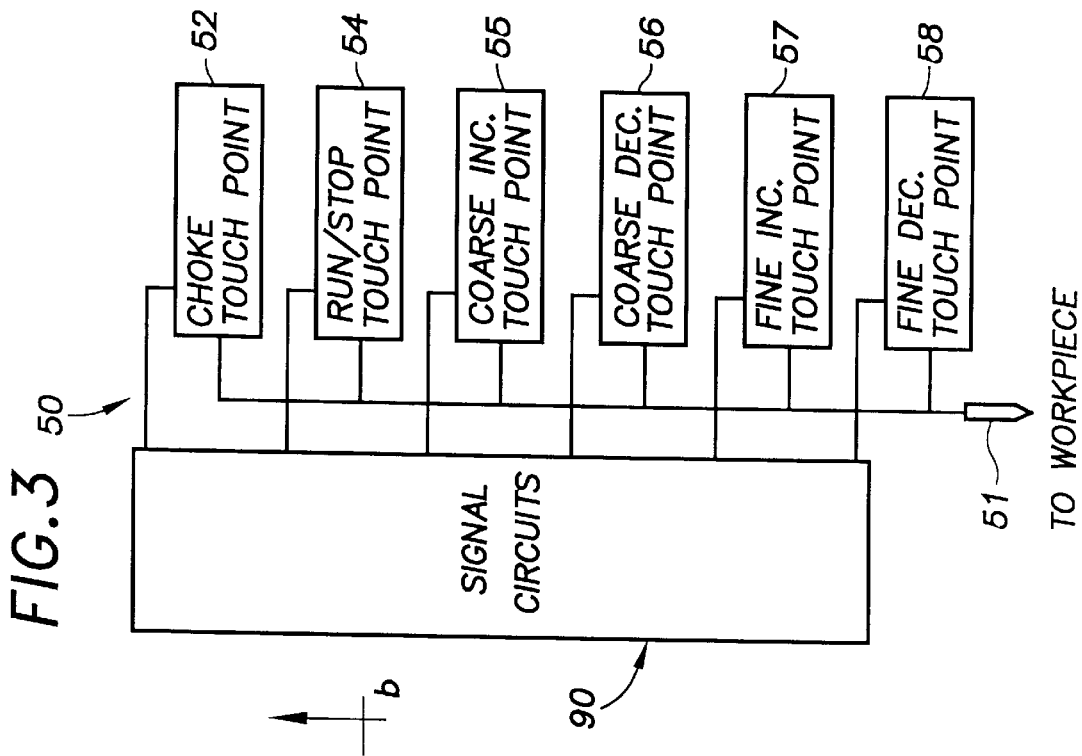
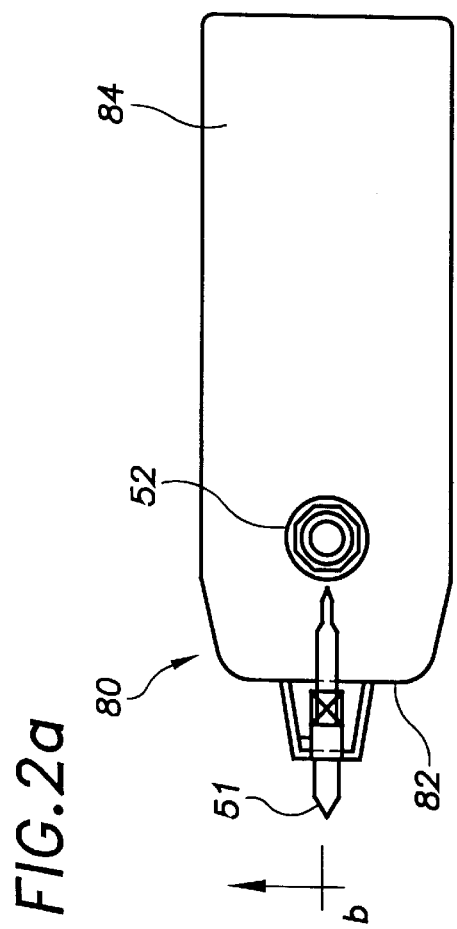
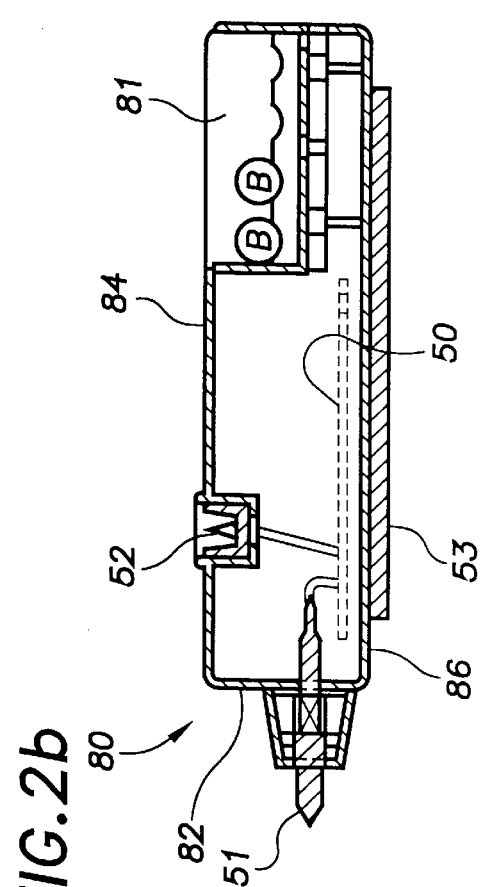

TO CURRENT TRANSFORMER SIGNAL SENSE CIRCUIT.

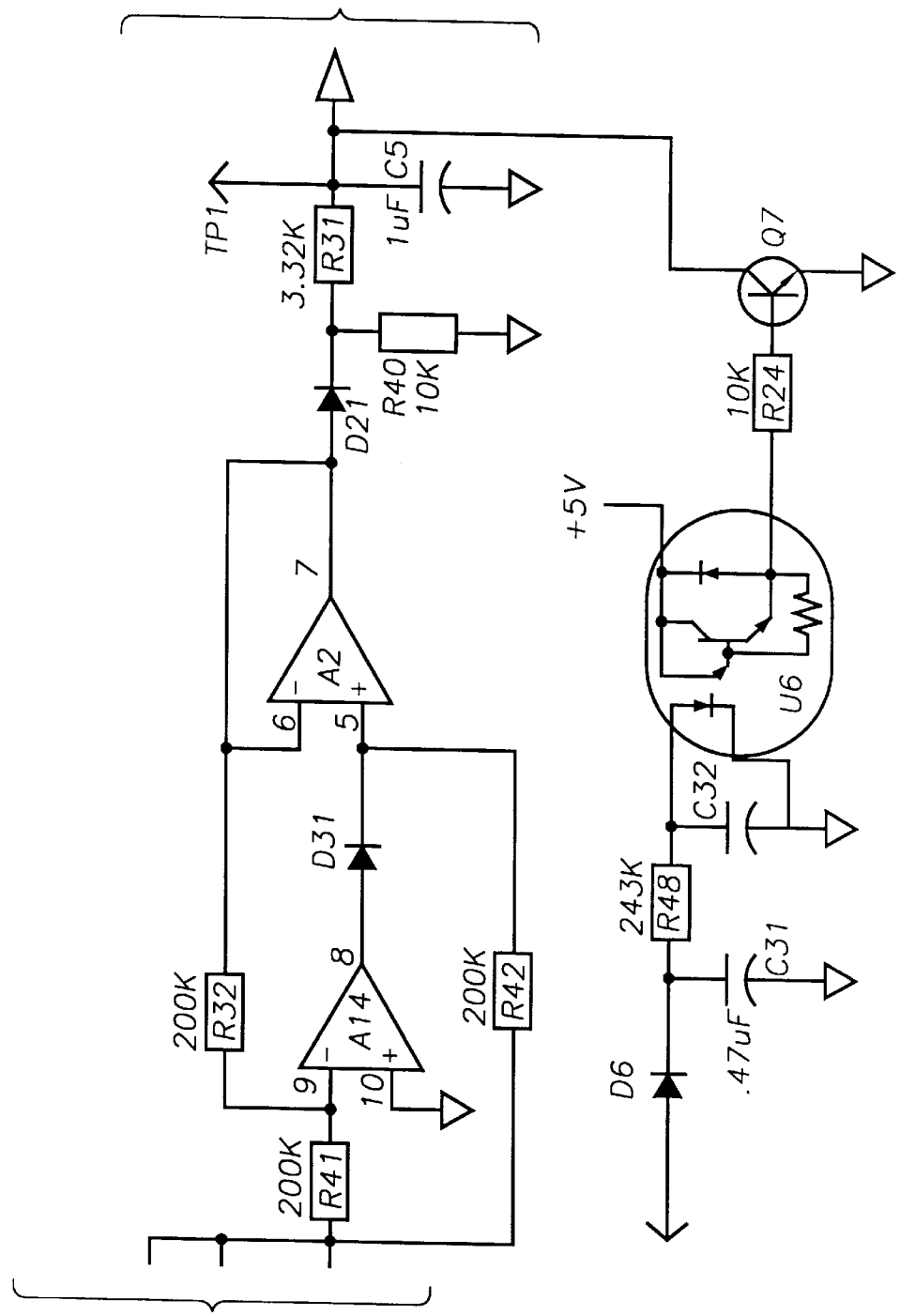

REMOTE CONTROL FOR WELDERS AND METHOD THEREFOR

BACKGROUND OF THE INVENTION

The invention relates generally to welders, and more particularly to systems and methods for remotely controlling welders using a remote device interposable between a workpiece and an electrode holder and communicating along the welding cable to control various operational parameters otherwise controllable locally from a control panel thereof.

Welding machines, or welders, are known generally and used widely for a variety of welding applications. Engine-driven welders include a combustion engine-driven generator that provides an electric welding current, and static welders obtain welding current from an electrical converter connected to an electrical power supply line. The welding current and other operational parameters of these and other welders are generally selectable and controllable locally from a control panel thereof.

In the Bobcat™ 225G Plus engine-driven welder, available from Miller Electric Mfg. Co., an Illinois Tool Works Company, Appleton, Wis., for example, the control panel includes AC/DC selects, polarity reversing selects, and coarse and fine current adjustment controls. The control panel of the Bobcat™ 225G Plus engine-driven welder also includes engine choke, start, run/off and low idle controls. Other welders may control some or all of these operational parameters. Static welding machines for example do not require engine choke and idle controls. Other operational parameters include wire feed and auxiliary power controls.

In many applications, especially engine-driven welder applications, welding is performed at a site remote from the welder and the control panel thereof. For convenience, it is known to control a limited number of welding parameters remotely from the control panel. Namely, coarse and fine current adjustment. U.S. Pat. No. 4,216,367 entitled "Wireless Remote Control for Electric Welder" issued Aug. 5, 1980 to Risberg and assigned commonly herewith, for example, discloses a device for remotely controlling weld current in an engine-driven welder to precise percentages of a current value selected previously at the control panel thereof. U.S. Pat. No. 4,216,367 discloses, more particularly, an adjustable rheostat temporarily disposable between a weld stick and workpiece to generate a calibrating current, which flows through the welding cable. The calibrating current is sensed by a current transformer and compared to a previously set and stored welding current reference, which is adjusted automatically after a slight delay to a new desired weld current value.

The present invention is drawn toward advancements in the art of welders, and more particularly to systems and methods for remotely controlling various operational parameters of welders including engine-driven and static welders.

The inventors of the present invention recognize the desirability of remotely starting and stopping welders, particularly engine-driven welders, in addition to or besides controlling weld current. More particularly, remotely starting and stopping welders without any additional cables between the remote site and the control panel thereof. Remote welder control eliminates the necessity of walking back and forth between the control panel and the work-site, which may be located a significant distance therefrom. In some applications, moreover, a plurality of welders are arranged in large banks of welders, which are operated by many welding operators at remote locations. The operators may not know, and it may be very difficult to ascertain, which welder is coupled to a particular welding cable. The advantage of remotely enabling and disabling the welder under these circumstances is self evident. Remote enabling and disabling engine-driven welders is desirable also for reducing engine and generator operation time, thereby extending the useable life thereof as well as other components of the welder. The known prior art however does not teach remote enabling and disabling of welders.

It is therefore an object of the invention to provide novel methods and systems for remotely controlling welders, and more particularly for remotely controlling operational parameters thereof by communicating over a welding cable with a remote device electrically coupleable between a workpiece and an electrode holder.

It is also an object of the invention to provide novel methods and systems for remotely controlling at least one, and preferably more than one, operational parameter of welders otherwise controllable locally from a control panel thereof, including remotely enabling and disabling the welder, remotely choking engine-driven welders, remotely controlling coarse and fine current adjustment, remotely reversing current polarity, among other operational parameters thereof.

It is a more particular object of the invention to provide novel methods and systems for remotely controlling welders having generally a welding cable and an electrode holder for supplying weld current to a workpiece, and one or more operation controls for locally controlling corresponding operational parameters from a control panel thereof. The novel methods and systems include a remote device having one or more operational parameter signal circuits electrically coupleable between the workpiece and the electrode holder for producing corresponding unique operational signals on a welding cable, a sensor circuit for detecting the operational signals and producing corresponding operational sense signals in response thereto, and an operational control circuit for actuating corresponding operation controls of the welder in response to the operational sense signals, thereby remotely controlling operational parameters of the welder corresponding to the unique operational signals produced by the remote device on the welding cable.

It is another more particular object of the invention to provide novel methods and systems for remotely controlling welders with a remote device having one or more constant current source circuits electrically coupleable between the workpiece and the electrode holder for selectively producing one or more corresponding unique operational signals on the welding cable. It is a related object of the invention to provide a battery powered remote device having one or more constant current source circuits coupled to a timer circuit that produces unique intermittent operational signals on the welding cable, whereby the intermittent operational signals reduce battery power consumption.

It is still another more particular object of the invention to provide novel methods and systems for remotely controlling welders having a current transformer sensor circuit for detecting operational signals produced by an alternating carrier wave on the welding cable.

It is a further object of the invention to provide novel methods and systems for remotely controlling welders with a remote device electrically coupleable between a workpiece and an electrode holder, wherein the remote device includes a first electrode coupleable to the workpiece and one or more second electrodes coupleable to the weld stick, or electrode holder, for generating unique operational signals on the welding cable, whereby the second electrodes are readily and accessibly contactable by the electrode holder to selectively remotely control corresponding operational parameters of the welder. It is a related object of the invention to magnetically and electrically couple the first electrode to ferromagnetic workpieces.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 2a is a top plan view of a pendant for housing a remote device disposeable between a weld stick and workpiece for controlling operational parameters of a welder.

FIG. 2b is a partial sectional view along lines b—b of FIG. 2a.

FIG. 3 is an exemplary schematic block diagram of a remote device according to an exemplary embodiment of the present invention.

FIGS. 5a and 5b are detailed electrical instrumentation circuit according to an exemplary embodiment of the present invention.

DETAILED DESCRIPTION OF THE INVENTION

Figure 1A:
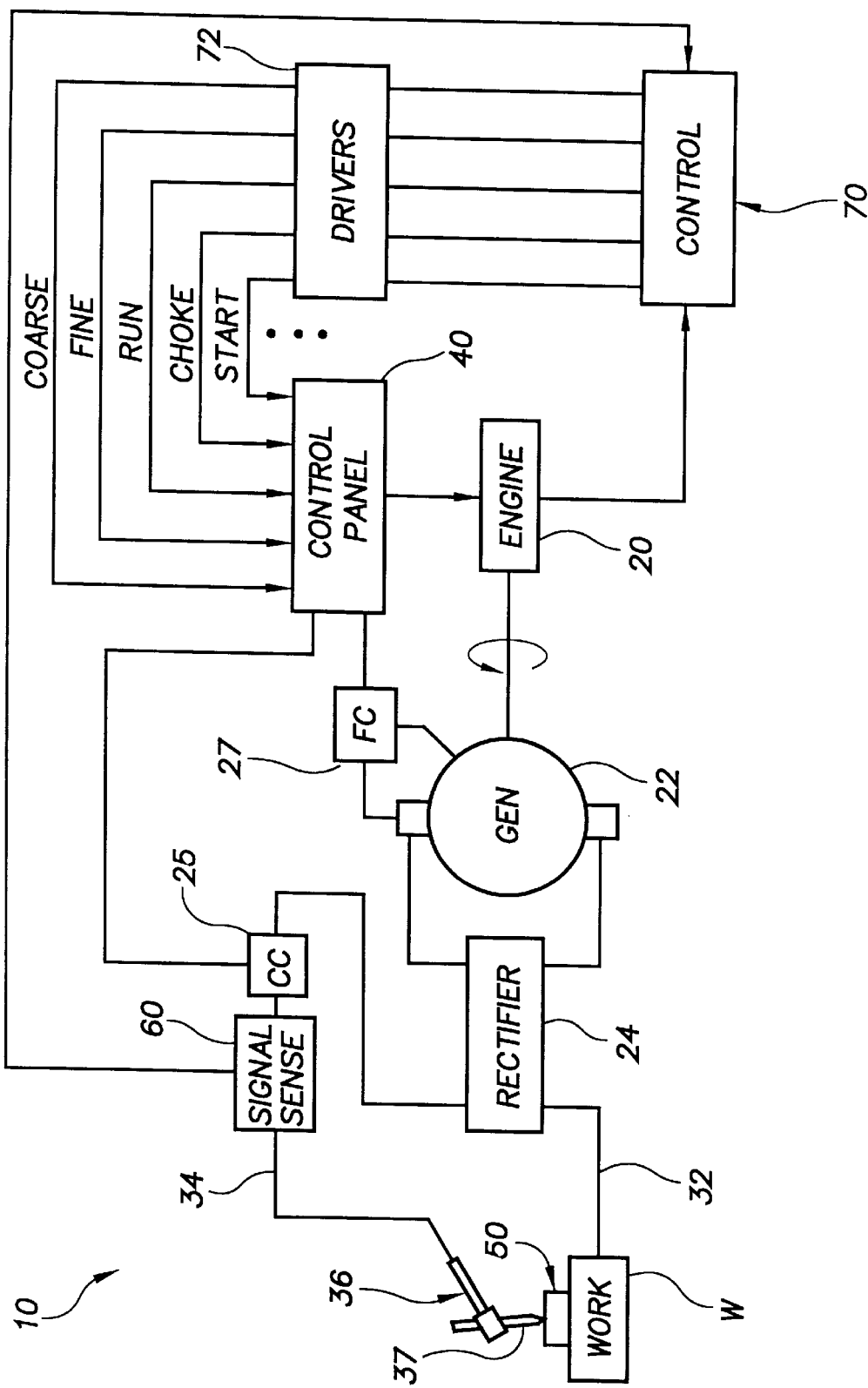
FIG. 1a is a block diagram of a remotely controllable engine-driven welder system according to an exemplary embodiment of the present invention.

FIG. 1a is a system 10 for remotely controlling one or more operational parameters of an engine-driven welder having a welding cable and an electrode holder for supplying welding current to a workpiece W, and one or more operation controls for controlling corresponding operational parameters thereof. The system 10 remotely controls one or more operational parameters otherwise controllable locally from a control panel of the welder, including remotely enabling and disabling the welder, remotely choking the engine and controlling the idle thereof, remotely controlling coarse and fine current adjustment, and remotely reversing current polarity, among other operational parameters of the welder.

In FIG. 1a, the engine-driven welder portion of the system 10 comprises generally a combustion engine 20 rotatably coupled to a generator 22 having a rectifier 24 at its output for supplying welding current through a first cable portion 32 coupled to the workpiece W, and a second cable portion 34 coupled to an electrode holder 36, which includes an electrode, or weld stick, or stinger 37. The engine-driven welder includes a control panel 40 with operation controls for controlling operational parameters thereof locally as is known generally. The operation controls include, for example, a start switch, a run switch, a choke switch, a variable coarse current increase and decrease control 25, and a variable fine current increase and decrease control 27. The operation controls may be electrical contacts or solid state switching devices or other controls. Most ignition systems, for example, include generally a start switch and a run switch, wherein the start and run switches may be electrical contacts or solid state switches. The coarse current control is often a multi-tapped transformer, and the fine current control is usually a variable rheostat.

Figure 1B:
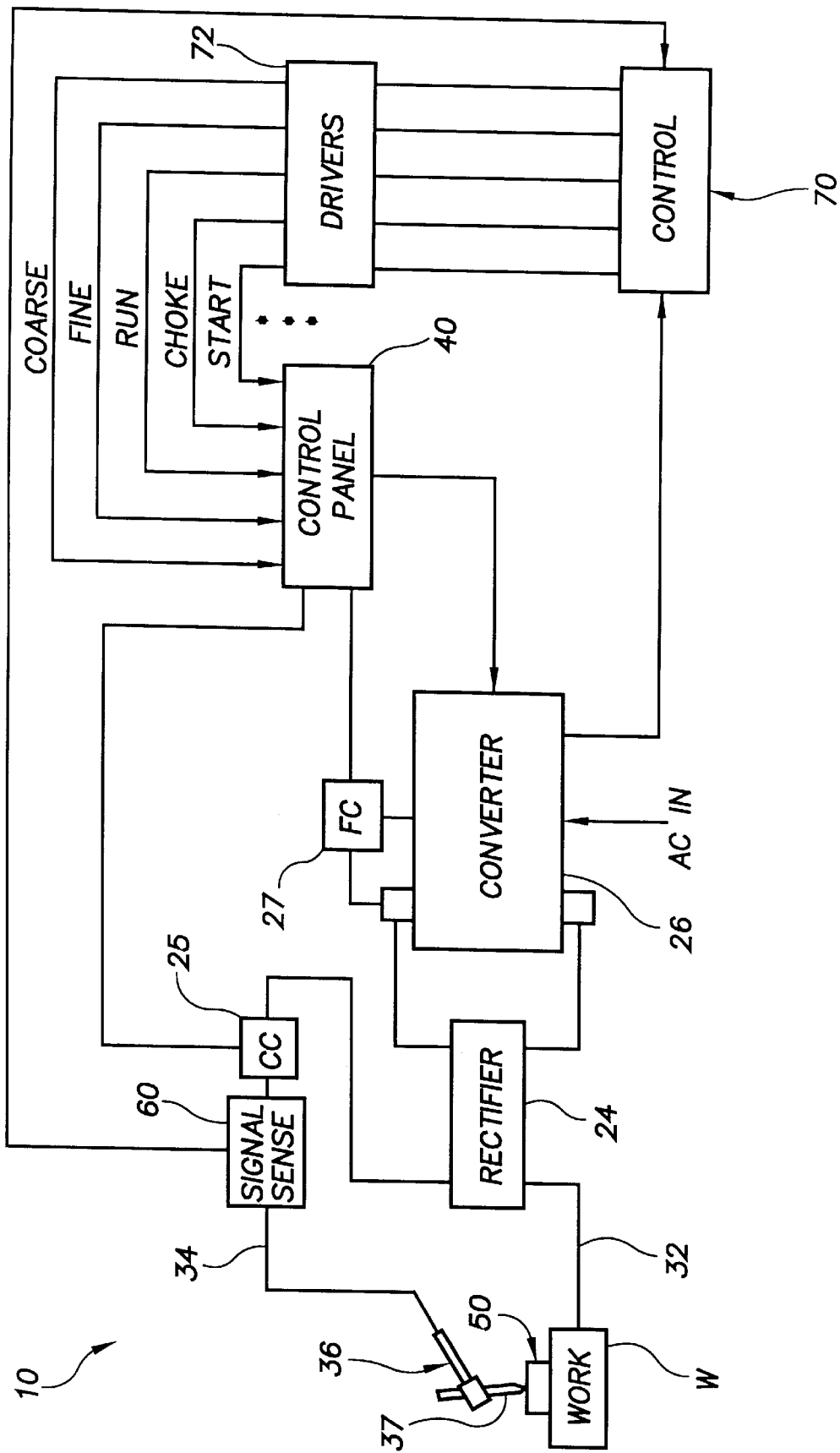
FIG. 1b is a block diagram of a remotely controllable static welder system according to an exemplary embodiment of the present invention.

FIG. 1b is a static welder system 11, which is similar in most respects to the engine-driven welder system 10 of FIG. 1a. except that the combustion engine 20 and generator 22 are replaced by an electrical converter 26 that converts an alternating current supply line input to an appropriate welding current supplied through a first cable portion 32 coupled to the workpiece W, and a second cable portion 34 coupled to an electrode holder 36 having an electrode 37. The static welder also includes a control panel 40 with operation controls for controlling operational parameters thereof locally similar to the controls on the engine-driven welder with the exception of the choke and possibly some other operation controls. The static welder system 11 also includes generally coarse and fine current controls, among other controls.

The welder systems of FIGS. 1a and 1b further comprise generally a remote device 50 having one or more operational parameter signal circuits electrically coupleable between the workpiece W and the electrode holder 36 for selectively producing unique operational signals on the welding cable, a signal sense circuit 60 for detecting the operational signals produced on the welding cable and for producing correspondingly unique operational sense signals in response thereto, and an operational control circuit 70, which may control drivers or relays 72 coupled to and actuating corresponding operation controls of the welder in response to the unique operational sense signals, thereby remotely controlling the operational parameters of the welder.

FIGS. 2a and 2b illustrate a hand held battery powered pendant 80 for housing the one or more operational parameter signal circuits of the remote device 50 for selectively producing the one or more corresponding operational signals on the welding cable when electrically coupled between the workpiece W and the electrode holder 36. The pendent 80 has exposedly mounted thereon a first electrode 51 of the remote device 50 coupleable to the workpiece W and one or more second electrodes 52 of the remote device, only one of which is shown in FIGS. 2a and 2b, corresponding to the one or more operational parameter signal circuits, which are coupleable to the electrode holder 36 for generating corresponding operational signals on the welding cable. The pendent 80 includes a battery storage bay 81 for mounting and electrically coupling one or more batteries B to the operational parameter signal circuits of the remote device 50 also housed therein. The batteries B are required to power the remote device 50 to produce operational signals on the weld cable during some phases of operation as discussed further below.

In one embodiment, the first electrode 51 is preferably disposed on an end 82 of the pendent 80 where it is more readily electrically engageable with the workpiece W by an operator wielding the pendent 80. The one or more second electrodes 52 are disposed preferably on an upper surface 84 of the pendent 80 where they are readily and accessibly contactable by the electrode holder 36, including the electrode 37 thereof, to remotely control corresponding operational parameters of the welder as discussed further below. The first and second electrodes 51 and 52 of the remote device 50 include preferably pointed tips to facilitate electrically contacting the workpiece W and the electrode holder 36, despite the tendency for the formation of oxides on the electrodes 51 and 52, and on the electrode 37 of the electrode holder 36, and on the workpiece W.

In another embodiment, the first electrode 51 is or includes a magnetic portion 53 disposed on a lower surface 86 of the pendant 80, wherein the magnetic portion 53 is magnetically and electrically coupleable to ferromagnetic workpieces. The pendent 80 may thus be adhered magnetically to the workpiece about a surface thereof by the operator during use. According to this aspect of the invention, the pendant 80 may be repositioned and remain adhered and electrically coupled to the workpiece when not in use, thereby reducing the possibility of misplacement thereof and eliminating the necessity of having to pocket or otherwise secure the pendant 80 between uses, which is a particularly convenient feature of the invention.

FIG. 3 illustrates schematically a remote device 50 having the first electrode 51 and a plurality of second electrodes 52, 54, 55, 56, 57, and 58, corresponding to a plurality of remotely controllable operational parameters of the welder, coupled to operational parameter signal circuits 90 that produce corresponding operational signals on the welding cable when electrically coupled between the workpiece W and the electrode holder 36. The operational parameter signal circuits 90 include, for example, among others a start signal circuit, a choke signal circuit, coarse current increase and decrease circuits, and fine current increase and decrease circuits for producing on the welding cable unique start, choke, coarse increase and decrease, and fine increase and decrease signals, respectively, depending on the particular type of welder.

Figure 4A:
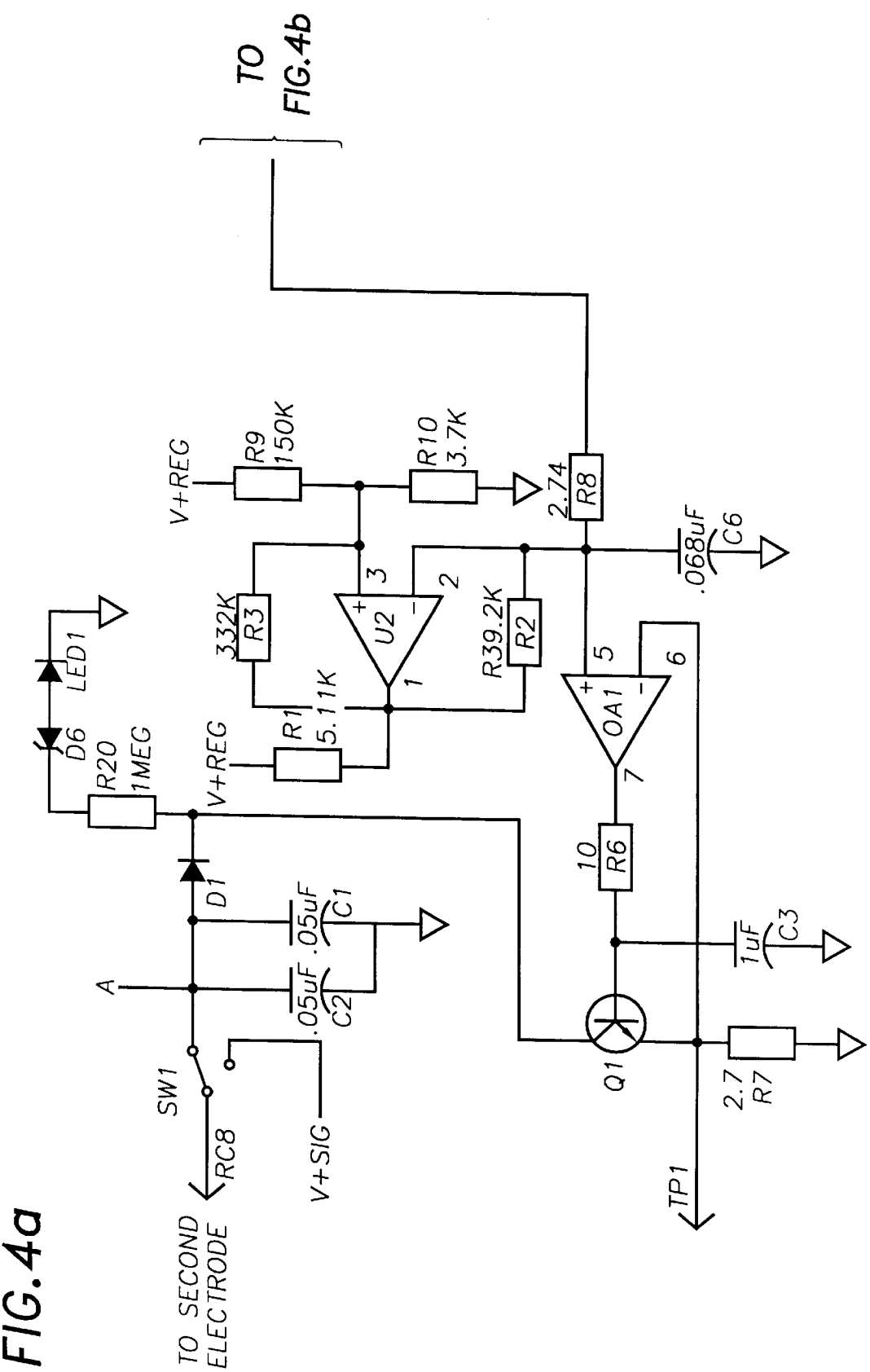
FIGS. 4a and 4b are detailed electrical circuit diagram of a remote device according to an exemplary embodiment of the present invention.
Figure 4B:
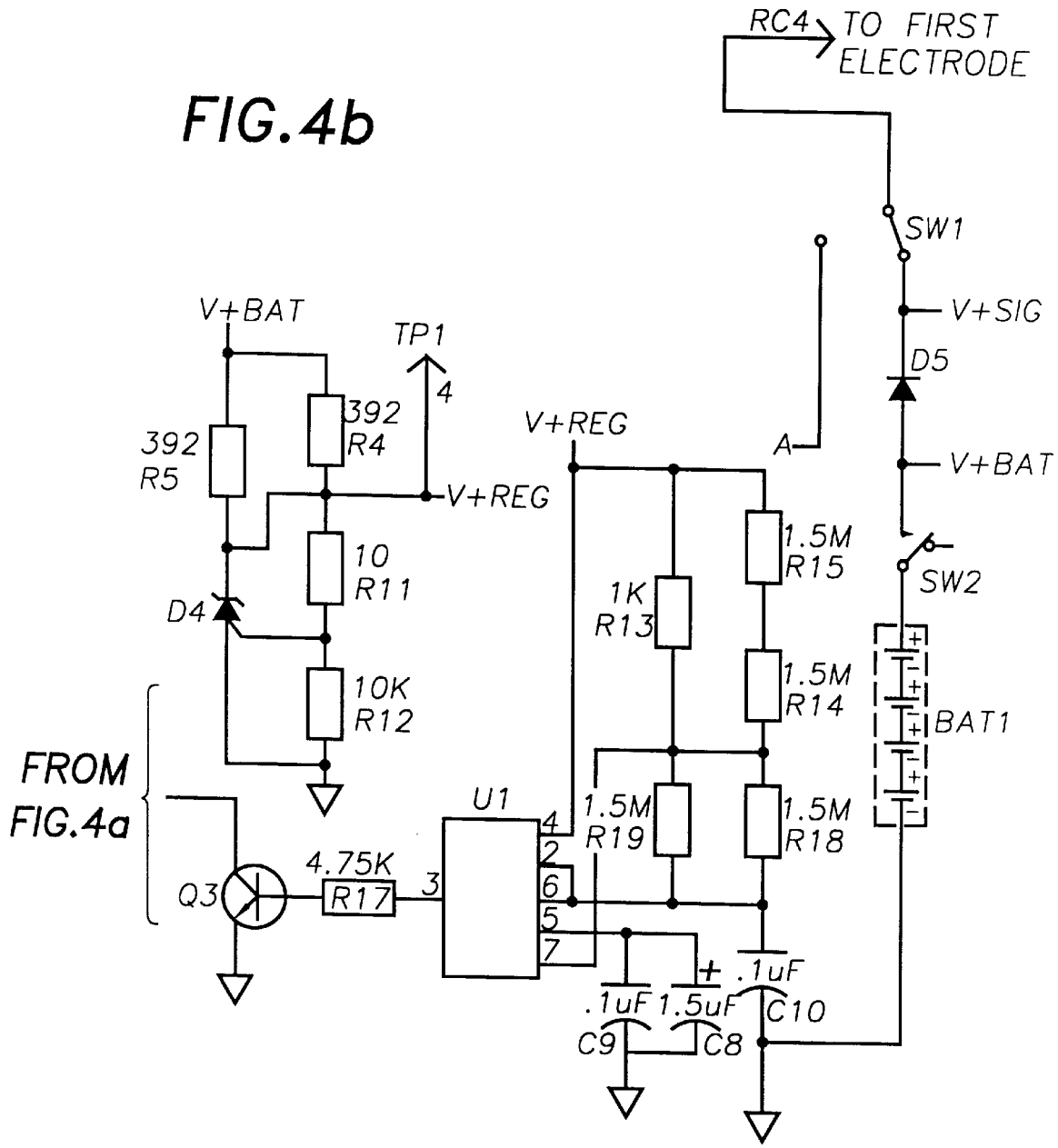

FIGS. 4a and 4b illustrate an exemplary operational parameter signal circuit of the remote device 50 for producing an operational signal on the welding cable when electrically coupled between the workpiece W and the electrode holder 36. The circuit includes a constant current source formed generally by op-amp OA1, transistor Q1, resistors R6 and R7, and capacitor C3. The output of the constant current source, and more particularly the collector of transistor Q1, is coupled to a corresponding one of the second electrodes 52 and 53–58, which is selectively coupleable to the electrode holder 36 to produce an operational signal on the welding cable. In the exemplary embodiment, diode D1 is disposed between the collector of Q1 and the electrode.

The amplitude of the operational signal produced by the exemplary constant current source circuit is dependent on the values of resistor R1, R2, R3, R7. R8, R9 and R10. In embodiments that control more than one operational parameter of the welder, there is a corresponding number of constant current source circuits electrically coupled in parallel in the remote device 50, wherein the collector of the transistor of each constant current source circuit is coupled to a corresponding first electrode, which is selectively contactable by the electrode holder 36 in the hands of a welding operator to produce the desired operational signal on the welding cable. The current amplitude corresponding to the operational signals produced on the welding cable is unique for each remotely controlled operational parameter of the welder, as discussed further below, by appropriately selecting different resistive values R1, R2, R7 and R8 for each of the constant current source circuits.

FIGS. 4a and 4b illustrate the operational parameter signal circuit powered by a battery BAT1 coupled between the input pin 5 of the op-amp OA1 and the first electrode 51. The battery BAT1 also supplies power to the collector of the transistor Q1. The battery BAT1 is required to power the remote device 50 before starting the welder. After the welder is powered, however a DC voltage supplied by the welder is available on the welding cable between the workpiece W and the electrode holder 36, which may be as high as 85 volts or more on some welders. The DC voltage from the welder is thus available to power the operational parameter signal instead of the battery BAT1 when the welder is powered and the remote device 50 is electrically coupled between the workpiece W and the electrode holder 36. The remote device 50 of the exemplary embodiment requires at least approximately 4.8 volts to operate, although other embodiments may be configured to operate on less voltage.

The remote device 50 also includes a switch SW1 for reversing the power supply polarity to the operational parameter signal circuit, and more particularly to the constant current source thereof. The power supply polarity reversal is required when the polarity of the welder is reversed at the control panel thereof as is desired for some welding applications.

FIGS. 4a and 4b illustrate a timer circuit coupled between the op-amp OA1 and the first electrode 51 including a 555 timer U1 having its output pin 3 coupled to the input pin 5 of the op-amp OA1 by transistor Q3 to intermittently drive the constant current source, thereby producing an intermittent operational signal on the welding cable. In one embodiment, the timer circuit is configured to produce an ON/OFF pulse with a 20 percent duty cycle, which in one configuration is ON for 100 milliseconds and is OFF for 400 milliseconds. The duty cycle of the 555 timer U1 is configurable by appropriate selection of resistors R13–R15, R18, R19 and C10. Other duty cycles may be used alternatively. The timer circuit is powered by a regulated voltage V+REG, as known generally, which is powered by either the battery or the DC voltage available on the welding cable. The intermittent operational signals generated by the constant current source reduce battery power consumption, which is particularly desirable when the remote device 50 is used to remotely start the welder and to remotely control other operational parameters thereof before the welder is running.

In embodiments having a plurality of constant current source circuits electrically coupled in parallel for controlling a corresponding plurality of operational parameters of the welder, as discussed above, a single timer circuit may modulate one or more of the constant current source circuits through a common driver transistor Q3. Thus, the remote device 50 includes generally a plurality of constant current source circuits arranged in parallel, and coupled to a corresponding second electrode for producing a corresponding plurality of unique operational signals on the welding cable when electrically coupled between the workpiece W and the electrode holder 36. The constant current source circuits may be driven by an intermittent drive signal from a timer circuit, which is desirable for reducing power consumption when remotely controlling operational parameters of the welder under battery power.

In the exemplary embodiment generally, the start signal circuit is a constant current source circuit, and the start signal produced on the welding cable is preferably a relatively low amplitude intermittent operational signal of approximately 0.5 amps and having a 20 percent duty cycle thereby minimizing battery power consumption since the remote device 50 operates on battery power to produce the start signal. Other operational signals produced by the remote device on the welding cable prior to starting the welder, for example the choke signal, are also preferably low amplitude intermittent signals to reduce battery power consumption. The higher amplitude current signals are preferably reserved for remotely controlling operational parameters while the welder is running, for example the coarse and fine current adjustments, since the energized welding cable has a low DC voltage thereon, which may be used by the remote device 50 for producing the higher amplitude signals.

FIG. 4a also illustrates an indicator circuit with a visual display for indicating when the welder is providing a DC voltage on the welding cable, and thus that the welder is powered. In the case of an engine-driven welder, the visual display is indicative that the engine is running. The indicator circuit includes a current limiting resister R20, and a zener diode D6 in series with a lamp LED1, which is preferably mounted in a visually conspicuous location on the pendant 80.

FIGS. 1a and 1b illustrate a signal sense circuit 60 for detecting the operational signals produced on the welding cable, and for producing corresponding operational sense signals in response thereto. The signal sense circuit 60 is disposed generally along the welding cable, wherein the welding cable includes the welding cable portions 32 and 34 and any other conductor in the rectifier 24 and generator 22 or electrical converter 26 supplying current thereto, and through which the operational signals are communicated and detectable by the signal sense circuit 60. The signal sense circuit 60 may include a differential amplifier coupled across a low resistance resistor, for example a 5 ohm resistor, disposed in series along the welding cable, wherein the resistor is protected by two diodes arranged in parallel with the resistor, but with polarities reversed.

In a preferred embodiment, the signal sense circuit 60 is a current sensor circuit, for example a commercially available current transformer. According to this embodiment, the remote circuit 50 produces preferably an alternating carrier wave for the operational signals. The alternating carrier wave distinguishes the operational signals from noise on the welding cable thereby facilitating detection of the operational signals by the current transformer. FIG. 4a illustrates, more particularly, an oscillator circuit coupled to the input pin 5 of the constant current source op-amp OA1, whereby the timer circuit modulates the AC signal from the oscillator circuit at the input pin 5 of the constant current source. The timer circuit is not an essential feature, although it remarkably increases the longevity of the batteries.

The oscillator circuit includes generally an op-amp U2, wherein the oscillation frequency is dependant upon the resistors R1–R3, R9, R10 and the capacitor C6 coupled thereto. In the exemplary embodiment, the frequency is preferably not less than approximately 900 Hertz, but may be more or less. Frequencies at this exemplary level, and higher, increase the signal strength from the current transformer sense circuit 60, and facilitate improved filtering thereof by an instrumentation circuit thereby providing less noisy signals to the controller 70 discussed further below. In embodiments having a plurality of constant current source circuits electrically coupled in parallel for controlling a corresponding plurality of operational parameters of the welder, as discussed above, a single oscillator circuit may provide the AC carrier signal to the plurality of constant current source circuits.

Figure 5A:
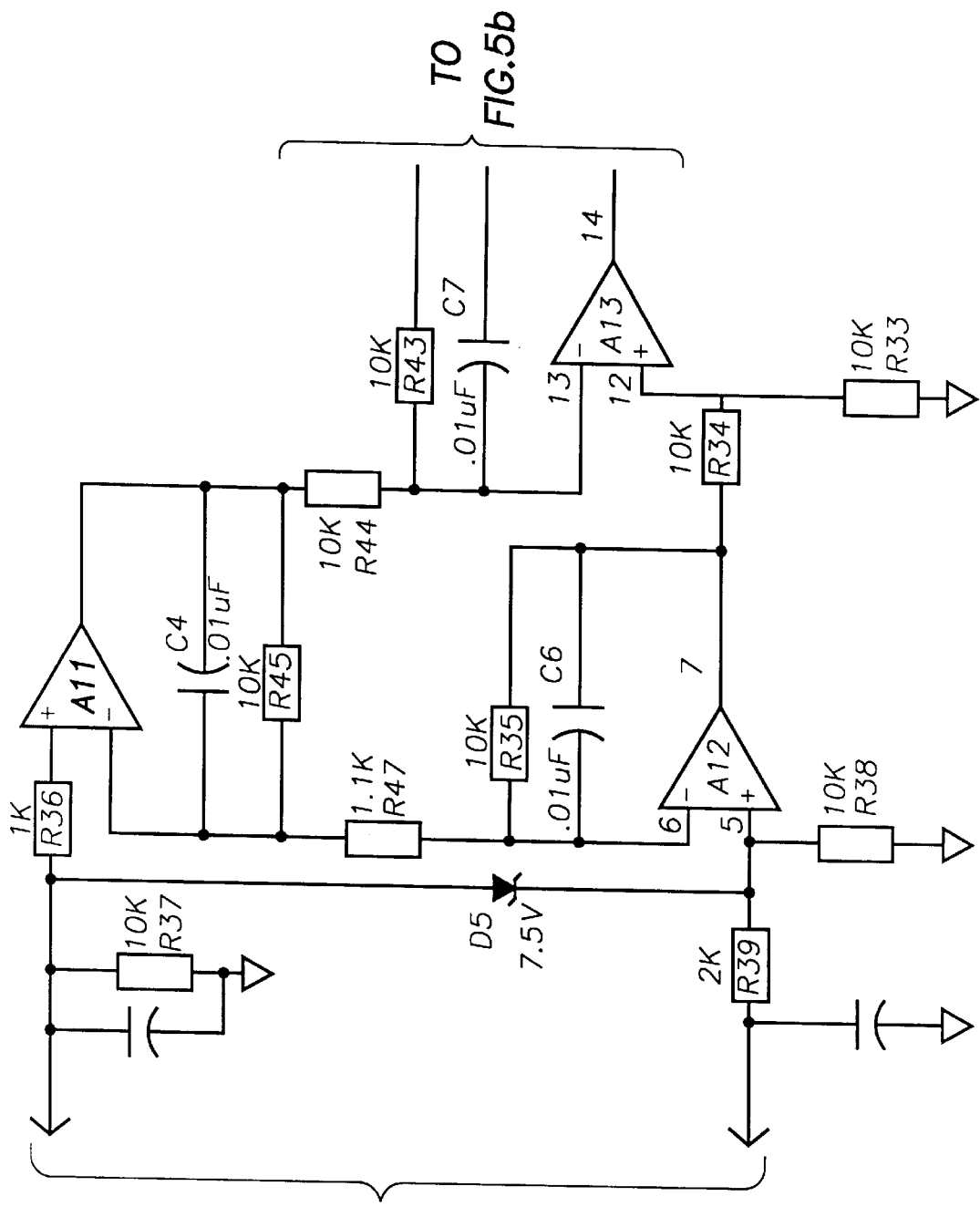

FIGS. 5a and 5b illustrate an exemplary instrumentation circuit coupled to the output of a current transformer signal sense circuit 60. In FIG. 5a, the instrumentation circuit includes a differential amplifier circuit formed by op-amps A11–A13. The gain of the amplifiers A11, A12 and A13 is set by feedback resistors R33–R35, R43, R44, R45 and R47 and corresponding parallel capacitors C4, C6 and C7. The input to the instrumentation amplifier is clamped by zener diode D5, and a high wattage resistor R39 dissipates excessive power applied thereto. In embodiments that include the alternative resistive signal sense circuit discussed above, the instrumentation circuit portion of FIG. 5a may not be required.

FIG. 5a illustrates further a signal stabilization and wave shaping circuit to stabilize and shape the operational sense signal generated by the sense signal circuit 60 in response to the operational signal produced by the remote device 50 on the welding cable. The signal stabilization and wave shaping circuit includes op-amps A14 and A23, rectifying diodes D21 and D31, resistors R31, R32 and R40–R42, and capacitor C5 for rectifying any negative component of the signal from op-amp A13. The signal stabilization and wave shaping circuit may alternatively be coupled to the output of the alternative resistive signal sense circuit 60 discussed above.

FIG. 5b also illustrates an operational signal sense disable circuit coupled generally to the output of the signal sense circuit 60, and in the exemplary embodiment to the output of the signal stabilization and wave shaping circuit at capacitor C5. A transistor Q7 pulls the capacitor C5 to ground in response to an input signal thereto indicating that the welder is providing power either for welding or to some other load coupled to an accessory AC outlet at the control panel of the welder.

In engine-driven welders, the input signal driving transistor Q7 is supplied, for example, from an idle module or an excitation rectifier of the welder. The signal is rectified by diode D6 and filtered by capacitors C31, C32 and resistor R48, and is isolated optically from the transistor Q7 by switch U6. When transistor Q7 is turned ON, by the presence of the input signal from the idle module or the excitation rectifier of the welder, the operational sense signal at the output of capacitor C5 is grounded, thereby blanking any input to the controller, and more particularly the comparator circuits of FIG. 6a discussed further below, to disable the remote control of the welder. In static welders the input signal driving the transistor Q7 is supplied from a load sensor, like a current transformer, in the electrical converter 26.

Figure 6A:
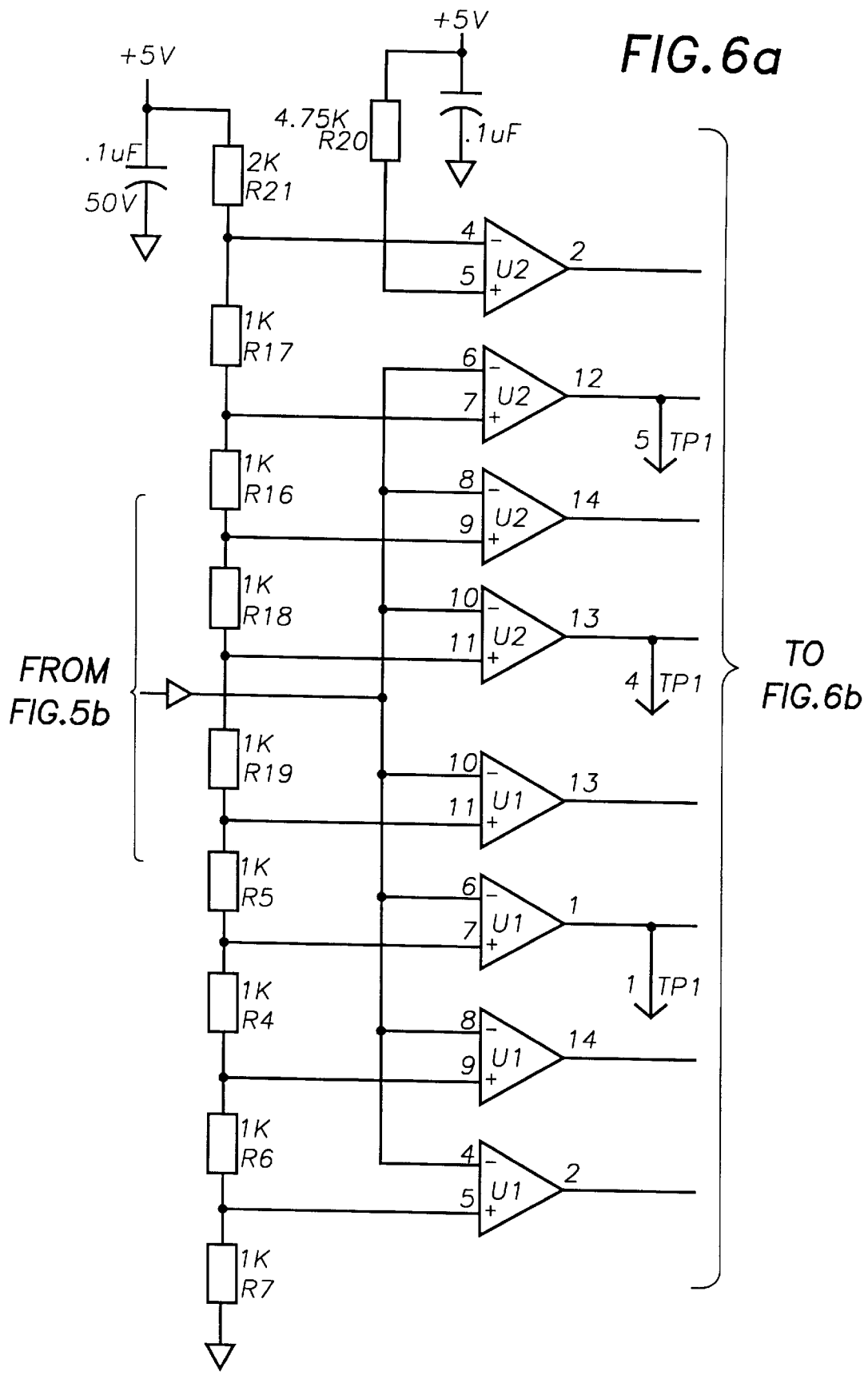
FIGS. 6a and 6b are partial detailed microprocessor based controller according to an exemplary embodiment of the present invention.

The operational sense signals generated by the signal sense circuit 60 are provided generally to a bank of comparator circuits of FIG. 6a. In the exemplary embodiment, the operational sense signals are supplied to the instrumentation circuit and the signal stabilization and wave shaping circuit, which in turn supply the operational sense signal to the comparator circuits of FIG. 6a. There are eight comparator circuits U1 and U2. Six of the comparator circuits correspond to remotely controllable operational parameters of the welder, which may for example be the operational parameters identified on the remote device in FIG. 3. There may be more or less, however, corresponding to the desired number of operational parameters controlled remotely. The six comparator circuits produce an output signal when the amplitude of the operational sense signal produced by the signal sense circuit 60 input thereto is at a threshold level determined by the resistive divider network formed by resistors R4–R7 and R16–R19 and R21. In the exemplary embodiment, for example, the threshold voltage for the comparator circuits differs by 0.5 volts and ranges between 0.5 volts and 4 volts, and the six comparator circuits corresponding to the operational sense signals have threshold voltages between 0.5 and 3.0 volts.

In the exemplary embodiment, the comparator having the lowest threshold of 0.5 volts and the comparator having the highest threshold of 4.0 volts define upper and lower limits on the range of signals interpreted by the microcontroller U4, wherein signals outside these range limits are disregarded as noise, and may be indicative that the welder is supplying power to a load, either via the welding cable or accessory AC outlets thereon.

Figure 6B:
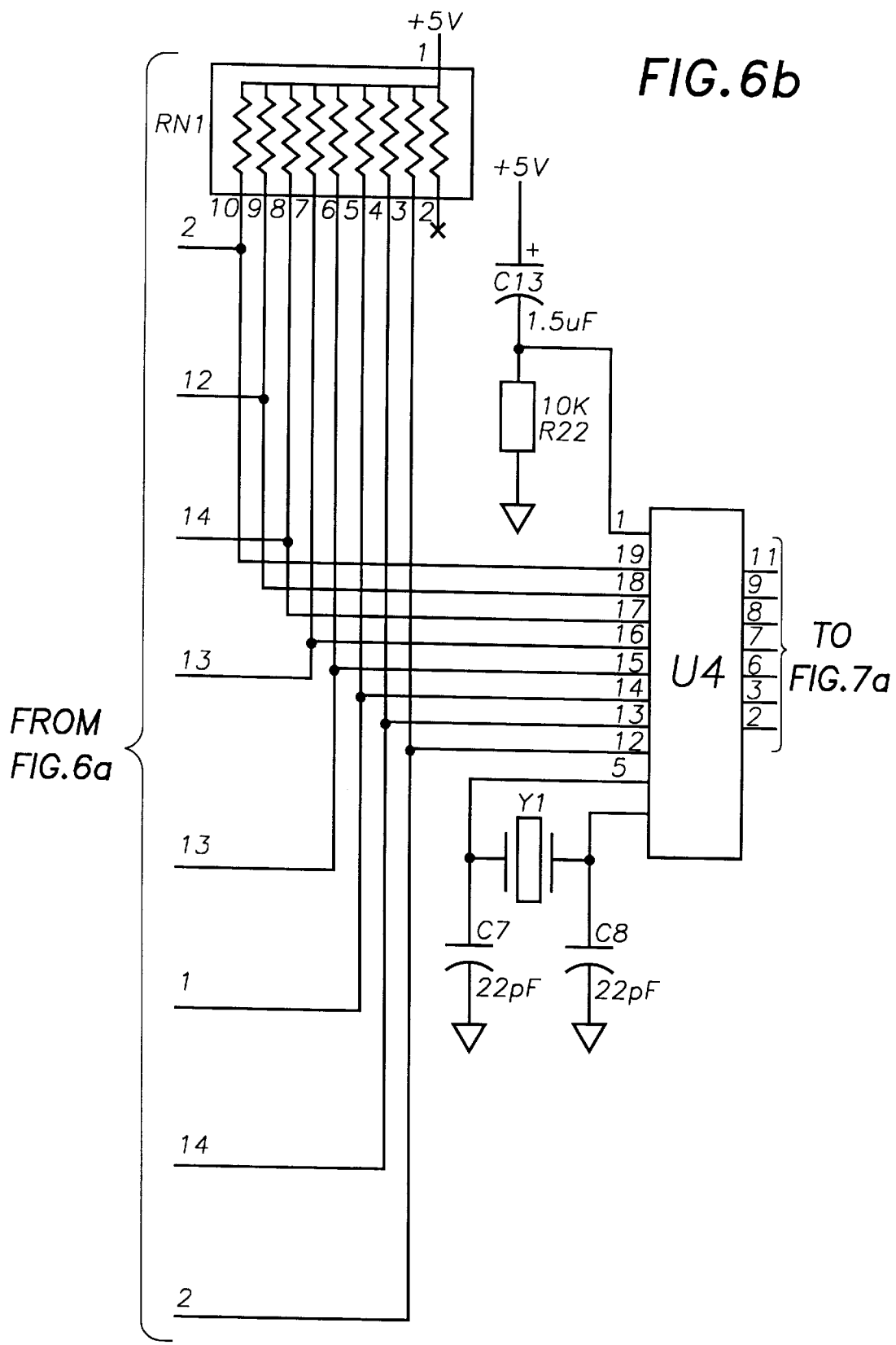

FIG. 6b illustrates the comparator circuit outputs coupled to a microprocessor based controller U4. The microcontroller U4 is programmed to determine which operational signal was produced by the remote device 50 on the welding cable based on the combination of comparator output signals produced in response to the operational sense signal input thereto. For example, a 1.5 volt signal generated by the sense signal circuit 60 in response to an operational signal produced on the welding cable will produce outputs from the three comparators circuits having thresholds of 0.5 volts, 1.0 volts and 1.5 volts. The microcontroller U4 is programmed to interpret the outputs from the comparator circuits as corresponding to a particular operational signal, and responsively actuates or de-actuates one or more corresponding operation controls at the control panel of the welder as discussed further below. Thus by producing unique operational signals on the welding cable with the remote device 50, which in the exemplary embodiment are defined by unique current amplitudes, the remote device 50 can transmit operational signals from the remote weld site along the welding cable back to the microcontroller U4, which interprets the operational signals and performs some control function at the control panel of the welder in response thereto as discussed further below.

Figure 7A:
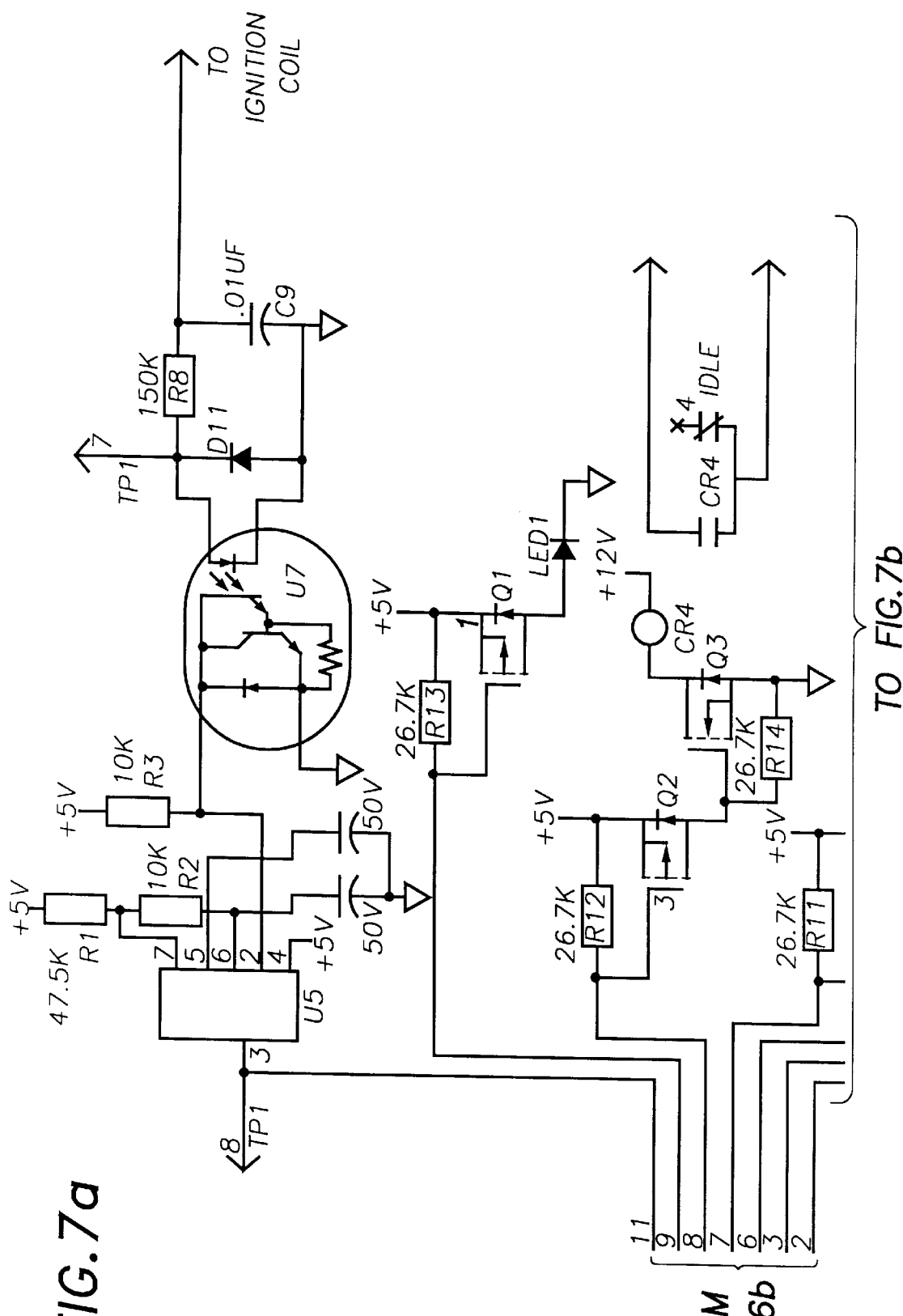
FIGS. 7a and 7b are partial detailed microprocessor based controller according to an exemplary embodiment of the present invention.
Figure 7B:
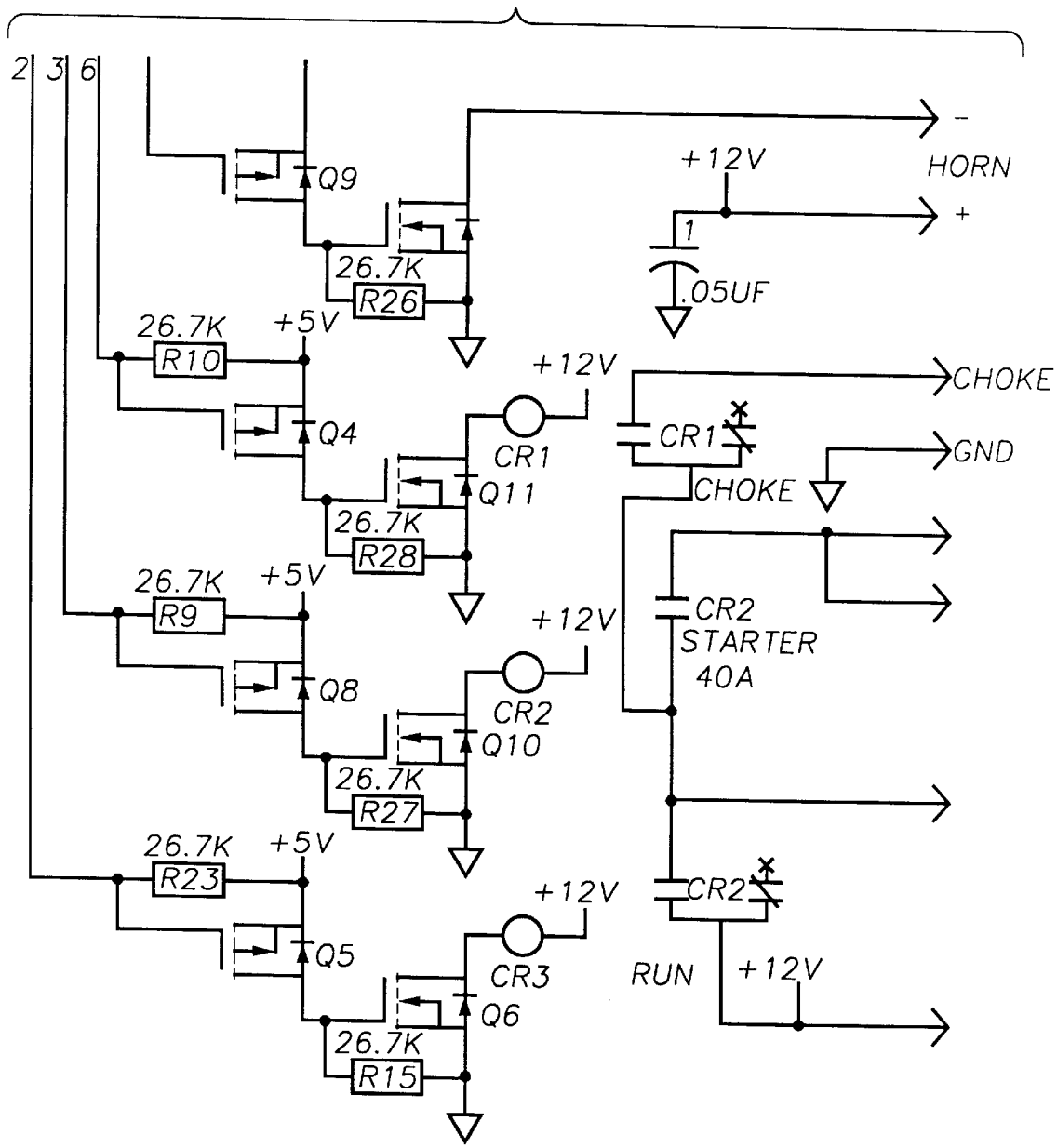

FIG. 7a illustrates outputs of the microcontroller U4 coupleable to several exemplary operation controls of an engine-driven welder control panel including more particularly an idle operation switch, a choke operation switch, a starter operation switch and a run operation switch. Generally, the outputs on lines 2, 3, 6 and 8 of the microcontroller drive corresponding FETs Q6, Q10, Q11 and Q3, which energize corresponding relays CR3, CR2, CR1 and CR4, respectively, in response to outputs from the microcontroller U4. The relays CR3, CR2, CR1 and CR4 are tied to the existing run, starter, choke, and idle operation switches in the control panel of the engine-drive welder.

Engine-driven welders include generally a start switch and a run switch for starting and running the welder. The run switch is usually actuated "on" initially by a switch at the control panel of the welder. To start the engine-driven welder, the start signal circuit in the remote device 50 is electrically coupled between the workpiece W and the electrode holder 36 to produce a start signal on the welding cable. This is performed by touching the electrode holder 36 onto the run/stop electrode 54 illustrated in FIG. 3 and contacting the first electrode 51 to the workpiece W. The sensor circuit 60 detects the start signal and produces a start sense signal in response thereto, which is transmitted to the controller 70, or microcontroller U4. If the welder is not running when the microcontroller U4 receives the start signal sense signal from the signal sensor 60, the microcontroller U4 energizes the starter relay to actuate the start switch of the welder. The microcontroller U4 determines whether the welder is running by monitoring the ignition coil frequency as discussed further below. After the welder starts and is running, the Microcontroller U4 de-energizes the starter relay, thereby de-actuating the start switch.

If the engine-driven welder is already running when the microcontroller U4 receives the start sense signal, the microcontroller will at least momentarily de-energize the run relay in response thereto, thereby stopping the engine-driven welder. The starting and stopping of the welder may be controlled remotely by electrically coupling the start signal circuit between the workpiece W and the electrode holder 36. The first start signal produced by the remote device on the welding cable starts the welder and a subsequent start signal stops the welder.

FIG. 7a illustrates an ignition coil of the engine-driven welder coupled to the microcontroller, which monitors the frequency thereof to determine whether the engine-driven welder, and more particularly the engine 20 thereof, is running or is merely being cranked by the starter motor thereof. The ignition coil frequency signal is filtered by resistor R8 and capacitor C9, and is optically coupled by U7 to the trigger input of a 555 timer circuit U5, which provides an input to pin 11 of the microcontroller U4. A relatively low frequency signal, approximately 8 Hertz in the exemplary embodiment, is indicative that the engine 20 is being cranked by the starter motor but is not yet running, whereas a higher frequency signal is indicative that the engine-driven welder is running. The ignition coil frequency signal is used by the microcontroller U4 to determine when the engine is running and when to disable the starter switch when the engine-driven welder is started remotely as discussed above. In the exemplary embodiment, the microcontroller U4 is programmed to disable the starter switch when the ignition coil frequency signal is approximately 16 Hertz.

In engine-driven welder applications, the microcontroller U4 is preferably programmed to increase the idle of the engine-driven welder by energizing relay CR4 on the output 8 thereof prior to starting the engine so that the engine starts at high idle. The engine-driven welder includes a load sensor circuit that increases or decreases the idle based on the electrical load drawn through the welding cable or by an auxiliary electrical outlet located on the front panel, as is known. The load sensor circuit will subsequently reduce the engine idle after starting in the absence of a load.

Engine-driven welders may also include an audio or visual indicator that is momentarily energized prior to starting the engine as a safety feature. FIG. 5c illustrates, more particularly, the microcontroller U4 output 7 coupled to a FET Q9. The controller U4 is programmed to temporarily energize a horn or other indicator driven by the FET Q9 prior to starting the welder in response to a start signal from the remote device.

The microcontroller U4 may also be programmed to temporarily energize the choke relay CR1 to choke the engine-driven welder prior to starting, or while cranking the engine if the engine does not start after a predetermined time period upon actuating the starter switch. In the exemplary embodiment of FIG. 3, the choke is also remotely controllable by the remote device 50, which may be desired prior to starting the engine-driven welder. To choke the engine-driven welder, a choke signal circuit in the remote device 50 is electrically coupled between the workpiece W and the electrode holder 36 to produce a choke signal on the welding cable. The sensor circuit 60 detects the choke signal and produces a choke sense signal in response thereto, which is transmitted to the controller 70, or microcontroller U4 in FIG. 6b.

FIG. 7a also illustrates an output line 9 of the microcontroller U4 coupled to FET Q1 for driving lamp LED1, which may be programmed for diagnostic purposes, for example to indicate the presence of noisy signals from a current sensor circuit 60 which are outside the upper range limit of the comparator circuits of FIG. 6a during calibration of the system.

The microcontroller U4 may more generally be coupled to alternative or additional operation controls as discussed hereinabove, including coarse and fine current controls, a polarity reversal switch, an AC/DC select switch, and a wire feed switch, among others, on the control panel of the welder.

In the case of the coarse and fine current adjustment controls, the microcontroller U4 includes corresponding fine current increase and decrease outputs and coarse current increase and decrease outputs, which drive corresponding stepper motors or solenoids or other known control devices that increase and decrease the coarse and fine currents. For example, each time the electrode holder 36 is touched onto the electrode 57 of the remote device 50 corresponding to the fine current increase, as shown in FIG. 3, a fine increase signal is produced on the welding cable and is detected by the signal sensor 60, which in turn generates a corresponding current increase sense signal that is transmitted to the controller 70. The controller 70 then responsively produces a control signal that operates the fine current increase control, usually a stepper motor or solenoid controlled variable rheostat, to increase the fine current some predetermined incremental amount programmed into the controller. The other current controls operate similarly. The controller 70 thus controls the operation controls on the control panel of the welder in response to corresponding operation signals produced on the welding cable by the remote device 50 thereby permitting remote control thereof.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The microcontroller may for example be replaced with analog and or other digital circuity. The present invention is therefore to be limited not by the specific exemplary embodiments disclosed herein but by all embodiments within the scope of the appended claims.

What is claimed is:

1. A remotely controllable welder having a welding cable and an electrode holder for supplying weld current to a workpiece and a start switch for starting the welder, the system comprising:

a remote device having a start signal circuit having a constant current source circuit electrically coupleable between the workpiece and the electrode holder, the start signal circuit produces a start signal on the welding cable when coupled between the workpiece and electrode holder;

a sensor circuit disposed along the welding cable, the sensor circuit producing a start sense signal in response to detecting the start signal on the welding cable;

a start control circuit coupled between the sensor circuit and the start switch, the start control circuit at least temporarily actuating the start switch in response to detection of the start sense signal;

whereby the welder is energizable when the start signal circuit is electrically coupled between the workpiece and the electrode holder.

2. The system of claim 1, the sensor circuit is a current sensor circuit, the start signal circuit further comprises an oscillator circuit coupled to the constant current source circuit, the oscillator circuit produces an alternating carrier wave for the start signal.

3. The system of claim 1 further comprising a timer circuit coupled to the constant current source circuit, the timer circuit produces an intermittent start signal, a battery power supply coupled to the constant current source circuit and the timer circuit.

4. The system of claim 1 further comprising a pendant housing the remote device, first and second electrodes disposed on the pendant and coupled to the start signal circuit, the first electrode couples the start signal circuit to the workpiece and the second electrode couples the start signal circuit to the electrode holder.

5. The system of claim 4, the first electrode is a magnetic electrode mounted on a surface of the pendant, the magnetic electrode is magnetically and electrically coupleable to ferromagnetic workpieces.

6. The system of claim 1, the welder having a coarse current increase control and a coarse current decrease control, the remote device further comprising:

a coarse current increase circuit electrically coupleable between the workpiece and the electrode holder, the course current increase circuit producing a coarse increase signal on the welding cable when coupled between the workpiece and electrode holder;

the sensor circuit producing a coarse increase sense signal in response to detecting the coarse increase signal on the welding cable;

a coarse increase control circuit coupled between the sensor circuit and the coarse current increase control, the coarse increase control circuit actuating the coarse current increase control in response to detection of the coarse increase sense signal;

a coarse current decrease circuit electrically coupleable between the workpiece and the electrode holder, the course current decrease circuit producing a coarse decrease signal on the welding cable when coupled between the workpiece and electrode holder;

the sensor circuit producing a coarse decrease sense signal in response to detection of the coarse decrease signal on the welding cable;

a coarse decrease control circuit coupled between the sensor circuit and the coarse current decrease control, the coarse decrease control circuit actuating the coarse current decrease control in response to detection of the coarse decrease sense signal, whereby coarse current is increasable and decreasable in response to electrically coupling a corresponding one of the coarse current increase circuit and the coarse current decrease circuit between the workpiece and the electrode holder.

7. The system of claim 1, the welder having a fine current increase control and a fine current decrease control, the remote device further comprising:

a fine current increase circuit electrically coupleable between the workpiece and the electrode holder, the fine current increase circuit producing a fine increase signal on the welding cable when coupled between the workpiece and electrode holder;

the sensor circuit producing a fine increase sense signal in response to detecting the fine increase signal on the welding cable;

a fine increase control circuit coupled between the sensor circuit and the fine current increase control, the fine increase control circuit actuating the fine current increase control in response to detection of the fine increase sense signal;

a fine current decrease circuit electrically coupleable between the workpiece and the electrode holder, the fine current decrease circuit producing a fine decrease signal on the welding cable when coupled between the workpiece and electrode holder;

the sensor circuit producing a fine decrease sense signal in response to detecting the fine decrease signal on the welding cable;

a fine decrease control circuit coupled between the sensor circuit and the fine current decrease control, the fine decrease control circuit actuating the fine current decrease control in response to detection of the fine decrease sense signal, whereby fine current is increasable and decreasable in response to electrically coupling a corresponding one of the fine current increase circuit and the fine current decrease circuit between the workpiece and the electrode holder.

8. The system of claim 1, the welder is an engine-driven welder having a run switch, the system further comprising a run control circuit coupled between the sensor circuit and the run switch, the run switch de-actuatable in response to a start sense signal produced on the welding cable when the start signal circuit is electrically coupled between the workpiece and the electrode holder after the engine-driven welder is energized, whereby the engine-driven welder is de-energized.

9. The system of claim 1, the welder is engine-driven welder having an indicator switch for at least temporarily enabling an indicator, the system further comprising an indicator control circuit coupled between the sensor circuit and the indicator switch, the indicator control circuit actuating the indicator switch at least temporarily in response to the start sense signal before the start switch is closed.

10. The system of claim 1, the welder is an engine-driven welder having choke switch for at least temporarily enabling a choke, the remote device further comprising:

a choke signal circuit electrically coupleable between the workpiece and the electrode holder, the choke signal circuit producing a choke signal on the welding cable when coupled between the workpiece and electrode holder;

the sensor circuit producing a choke sense signal in response to detecting the choke signal on the welding cable;

a choke control circuit coupled between the sensor circuit and the choke switch, the choke control circuit actuating the choke switch in response to detection of the choke sense signal, whereby the choke is at least temporarily enabled in response to electrically coupling the choke signal circuit between the workpiece and the electrode holder.

11. A remotely controllable welder having a welding cable and an electrode holder for supplying weld current to a workpiece, and at least one operation control for controlling an operational parameter of the welder, the system comprising:

a remote device having a constant current source circuit electrically coupleable between the workpiece and the electrode holder, the constant current source circuit produces an operational signal on the welding cable when coupled between the workpiece and electrode holder;

a sensor circuit disposed along the welding cable, the sensor circuit producing an operational sense signal in response to detecting the operational signal on the welding cable;

an operational control circuit coupled between the sensor circuit and the operation control, the operational control circuit actuating the operation control in response to detection of the operational sense signal, whereby the operational parameter of the welder is controllable when the constant current source circuit is electrically coupled between the workpiece and the electrode holder.

12. The system of claim 11 further comprising a timer circuit coupled to the constant current source circuit, the timer circuit produces an intermittent operational signal, a battery power supply coupled to the constant current source circuit and the timer circuit.

13. The system of claim 11 further comprising an oscillator circuit coupled to the constant current source circuit, the oscillator circuit produces an alternating carrier wave for the operational signal, the sensor circuit is a current sensor circuit.

14. The system of claim 13, the current sensor is disposed about the welding cable.

15. The system of claim 11, the welder having a plurality of at least two operation controls for controlling corresponding operational parameters of the welder, the system further comprising a plurality of at least two constant current source circuits arranged in parallel in the remote device, each of the plurality of constant current source circuits electrically coupleable between the workpiece and the electrode holder and producing a unique operational signal on the welding cable when coupled between the workpiece and electrode holder;

the sensor circuit producing correspondingly unique operational sense signals in response to detecting the unique operational signals on the welding cable;

the operational control circuit coupled between the sensor circuit and the plurality of operation controls, the operational control circuit actuating one of the operation controls of the welder in response to detection of a corresponding one of the unique operational sense signals, whereby the operational parameters of the welder are selectively controllable by electrically coupling one of the plurality of constant current source circuits between the workpiece and the electrode holder.

16. The system of claim 15, the plurality of operational signals produced on the welding cable by the plurality of constant current source circuits having different amplitudes.

17. The system of claim 11 further comprising a pendant housing the remote device, first and second electrodes disposed on the pendant and coupled to the plurality of constant current source circuits, the first electrode couples the constant current source circuit to the workpiece, and the second electrode couples the constant current source circuit to the electrode holder.

18. The system of claim 17, the first electrode is a magnetic electrode disposed on a surface of the pendant, the magnetic electrode magnetically and electrically coupleable to ferromagnetic workpieces.

19. A method for a remotely controllable welder having a welding cable and an electrode holder for supplying weld current to a workpiece, a start switch for starting the welder and an indicator switch for at least temporarily enabling an indicator, the method comprising:

producing a start signal on the welding cable by electrically coupling a start signal circuit between the workpiece and the electrode holder;

producing a start sense signal in response to detecting the start signal with a sensor circuit;

at least temporarily actuating the start switch in response to detection of the start sense signal;

actuating the indicator switch at least temporarily in response to the start sense signal before actuating the start switch, whereby the welder is energized in response to electrically coupling the start signal circuit between the workpiece and the electrode holder.

20. The method of claim 19, the welder having a coarse current increase control and a coarse current decrease control, the method further comprising:

producing a coarse increase signal on the welding cable by electrically coupling a coarse increase signal circuit between the workpiece and the electrode holder;

producing a coarse increase sense signal in response to detecting the coarse increase signal with a sensor circuit;

actuating the coarse current increase control in response to the coarse increase sense signal;

producing a coarse decrease signal on the welding cable by electrically coupling a coarse decrease signal circuit between the workpiece and the electrode holder;

producing a coarse decrease sense signal in response to detecting the coarse decrease signal with a sensor circuit;

actuating the coarse current decrease control in response to the coarse decrease sense signal, whereby coarse current is incrementally increasable and decreasable in response to electrically coupling a corresponding one of the coarse current increase circuit and the coarse current decrease circuit between the workpiece and the electrode holder.

21. The method of claim 19, the welder having a fine current increase control and a fine current decrease control, the method further comprising:

producing a fine increase signal on the welding cable by electrically coupling a fine increase signal circuit between the workpiece and the electrode holder;

producing a fine increase sense signal in response to detecting the fine increase signal with a sensor circuit;

actuating the fine current increase control in response to the fine increase sense signal;

producing a fine decrease signal on the welding cable by electrically coupling a fine decrease signal circuit between the workpiece and the electrode holder;

producing a fine decrease sense signal in response to detecting the fine decrease signal with a sensor circuit;

actuating the fine current decrease control in response to the fine decrease sense signal, whereby fine current is incrementally increasable and decreasable in response to electrically coupling a corresponding one of the fine current increase circuit and the fine current decrease circuit between the workpiece and the electrode holder.

22. The method of claim 19, further comprising coupling the start signal circuit to the workpiece with a first electrode on a remote device, and coupling the start signal circuit to the electrode holder with a second electrode on the remote device.

23. The method of claim 22 further comprising magnetically and electrically coupling the workpiece to the start signal circuit with a magnetic electrode.

24. The method of claim 19, producing the start sense signal in response to detecting the start signal with a current sensor circuit disposed along the welding cable.

25. The method of claim 19 further comprising producing the start signal on the welding cable by electrically coupling a constant current source circuit between the workpiece and the electrode holder.

26. The method of claim 19 further comprising producing the start signal with an alternating carrier wave, and detecting the start signal with a current sensor circuit.

27. The method of claim 19 further comprising modulating the start signal to produce an intermittent start signal, and powering the start signal circuit with a battery.

28. The method of claim 19, the welder is an engine-driven welder having run switch, the method further comprising at least temporarily de-actuating the run switch with a run control circuit in response to a start sense signal produced on the welding cable when the start signal circuit is electrically coupled between the workpiece and the electrode holder after the welder is energized, whereby the welder is de-energized.

29. The method of claim 19, the welder is an engine-driven welder having a choke switch for enabling a choke, the method further comprising:

producing a choke signal on the welding, cable by electrically coupling a choke signal circuit between the workpiece and the electrode holder;

producing a choke sense signal in response to detecting the choke signal with a sensor circuit;

at least temporarily actuating the choke switch in response to the choke sense signal, whereby the choke is enabled at least temporarily in response to electrically coupling the choke signal circuit between the workpiece and the electrode holder.

30. A remotely controllable engine-driven welder having a welding cable and an electrode holder for supplying weld current to a workpiece, a start switch for starting the welder and an indicator switch for at least temporarily enabling an indicator, the system comprising:

a remote device having a start signal circuit electrically coupleable between the workpiece and the electrode holder, the start signal circuit produces a start signal on the welding cable when coupled between the workpiece and electrode holder;

a sensor circuit disposed along the welding cable, the sensor circuit producing a start sense signal in response to detecting the start signal on the welding cable;

a start control circuit coupled between the sensor circuit and the start switch, the start control circuit at least temporarily actuating the start switch in response to detection of the start sense signal;

an indicator control circuit coupled between the sensor circuit and the indicator switch, whereby the indicator control circuit actuates the indicator switch at least temporarily before the welder is started.

31. The system of claim 30, the start signal circuit comprises a constant current source circuit.

32. A remotely controllable welder having a welding cable, an electrode holder for supplying weld current to a workpiece, and at least one operation control for controlling an operational parameter of the welder, the system comprising:

a pendant housing a remote device having an operational parameter circuit;

a magnetic first electrode disposed on the pendant;

a second electrode disposed on the pendant;

the first and second electrodes coupled to the operational parameter circuit;

a sensor circuit disposed along the welding cable and coupled to the operation control;

the first electrode is magnetically and electrically connectable to the workpiece, whereby the electrode holder is electrically connectable to the second electrode to electrically couple the operational parameter circuit between the workpiece and the electrode holder.

33. A method for a remotely controllable welder having a welding cable and an electrode holder for supplying weld current to a workpiece, and an operation control for controlling an operational parameter of the welder, the method comprising:

producing an operational signal on the welding cable by electrically coupling a constant current source circuit between the workpiece and the electrode holder;

producing an operational sense signal with a sensor circuit in response to detecting the operational signal on the welding cable;

actuating the operation control with an operational control circuit in response to detecting the operational sense signal, whereby the operational parameter of the welder is controlled remotely.

34. A remotely controllable welder for welding a workpiece, comprising:

a welding cable having a welding electrode coupled thereto;

a remote device;

a constant current source circuit disposed in the remote device and electrically connectable between the workpiece and the welding electrode;

a sensor circuit disposed along the welding cable;

the constant current source circuit produces an operational signal on the welding cable when coupled between the workpiece and welding electrode;

the sensor circuit produces an operational sense signal in response to detecting the operational signal on the welding cable.

35. The welder of claim 34 further comprising a timer circuit coupled to the constant current source circuit, a battery coupled to the constant current source circuit and the timer circuit, the timer circuit operates the constant current source circuit intermittently, whereby the operational signal produced thereby is intermittent.

36. The welder of claim 34 further comprising an oscillator circuit coupled to the constant current source circuit, the oscillator circuit produces an alternating carrier wave for the operational signal, the sensor circuit is a current sensor circuit.

37. The welder of claim 34, a plurality of constant current source circuits electrically connected in parallel and disposed in the remote device, each of the plurality of constant current source circuits electrically connectable between the workpiece and the welding electrode, the plurality of constant current source circuits each produce a unique operational signal on the welding cable when coupled between the workpiece and welding electrode, the sensor circuit produces a unique operational sense signal in response to detecting a corresponding one of the unique operational signals on the welding cable.

38. The welder of claim 37, the welder having a plurality of operation controls for controlling corresponding operational parameters thereof, the welder further comprising:

an operational control circuit coupled between the sensor circuit and the plurality of operation controls, the operational control circuit actuating one of the operation controls of the welder in response to generation of a corresponding one of the unique operational sense signals.

39. The welder of claim 37, the unique operational signals produced by the plurality of constant current source circuits have different amplitudes.

40. The welder of claim 37, a pendant housing the remote device, a common electrode disposed on the pendant and coupled to the plurality of constant current source circuits, a plurality of discrete electrodes disposed on the pendant, each of the plurality of discrete electrodes coupled to a corresponding one of the plurality of constant current source circuits, whereby the common electrode is connectable to the workpiece and the welding electrode is contactable with one of the plurality of discrete electrodes to produce one of the unique operational signals on the welding cable.

41. The welder of claim 34, a pendant housing the remote device, a first electrode disposed on the pendant and coupled to the constant current source circuit, a second electrode disposed on the pendant and coupled to the constant current source circuit, whereby the first electrode is connectable with the workpiece and the welding electrode is contactable with the second electrode to produce the operational signal on the welding cable.

42. The welder of claim 41, the first electrode is magnetic.

* * * * *